United States Patent Office 3,260,383
Patented July 12, 1966

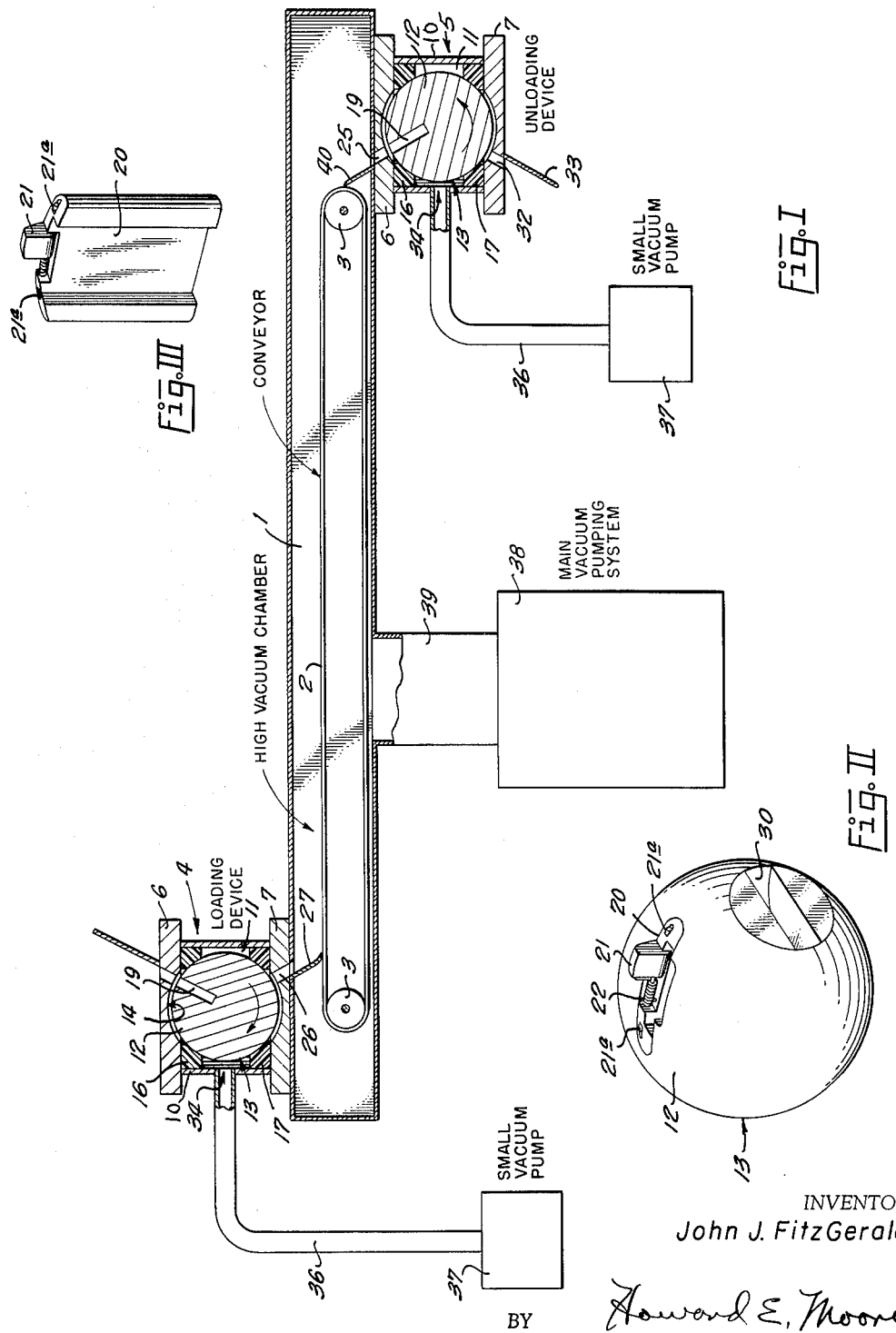

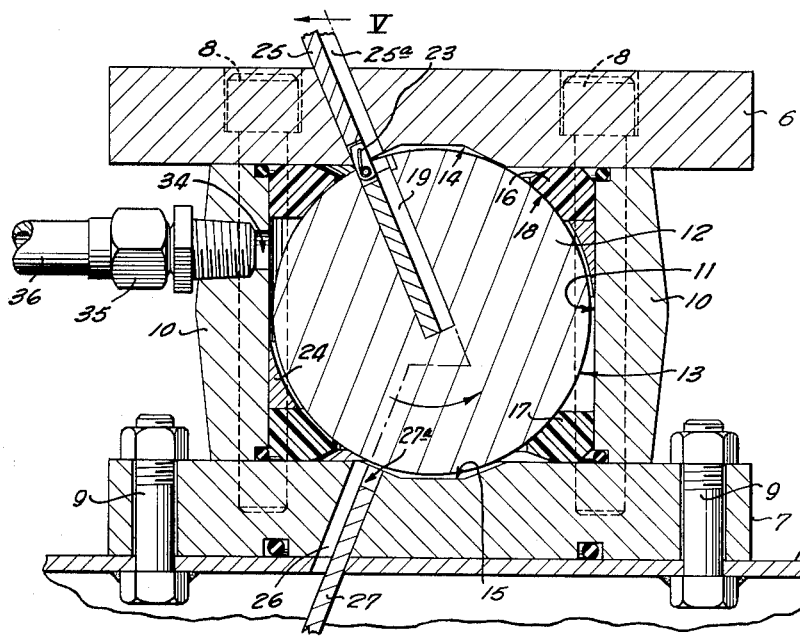

3,260,383
METHOD AND APPARATUS FOR LOADING AND UNLOADING A HIGH VACUUM PROCESS CHAMBER
John J. FitzGerald, Dallas, Tex., assignor to Vacuum Processes, Inc., Dallas, Tex., a corporation of Texas
Filed Aug. 4, 1964, Ser. No. 387,401
10 Claims. (Cl. 214—17)

This invention is concerned with the device for loading and unloading objects from a high vacuum process chamber, and is particularly concerned with a device for passing objects into and out of a vacuum chamber, where they are processed while sealed from the atmosphere by appropriate seals, and while under a vacuum.

A high vacuum process chamber is a chamber in which a high vacuum is drawn to subject materials passed therethrough, or disposed therein, to the high vacuum in order to dry same or remove moisture and volatile material therefrom for hardening or improving the dielectric qualities thereof, or otherwise treating and conditioning same.

The present invention comprehends a process and device wherein the object to be subjected to high vacuum is introduced into the high vacuum chamber under vacuum and is ejected therefrom while maintaining the vacuum thereon, and while the high vacuum chamber is sealed and isolated from the atmosphere.

The primary object of the invention is to provide a loading and unloading device for a high vacuum chamber comprising a rotatable carrier with a spherical surface thereon, rotated in contact with circular seals engaging the spherical surface in sealing relationship thereto, said seals being in spaced relationship providing an evacuated area therebetween, and a carrier slot in the carrier arranged to receive the article to be passed into and out of the vacuum chamber.

It is another object of the invention to provide such a loading and unloading device for a high vacuum chamber wherein the carrier recess in the carrier is closed while the recess is moving from loading position to discharge position, and is automatically closed and opened by a spring urged closure member at the mouth of the recess.

A still further object of the invention is to provide a loading and unloading device for a high vacuum chamber wherein the high vacuum chamber is positively sealed and isolated from atmosphere from whence the article to be treated is passed into or out of the vacuum chamber.

Still another object of the invention is to provide a loading and unloading device for a high vacuum chamber which is simple and economical to manufacture and easy to install and operate.

Other and further objects of the invention will become apparent upon reading the detailed specification hereinafter following and by referring to the drawing annexed hereto.

A suitable embodiment of the invention is shown in the attached drawings wherein:

FIGURE I is a semi-schematic side elevational view partially sectionalized showing the loading and unloading devices in their relationship to a high vacuum chamber;

FIGURE II is a perspective view of the carrier with spherical surface;

FIGURE III is a perspective view of the spring loaded door and support therefor;

FIGURE IV is a vertical sectional view of the loading and unloading device;

FIGURE V is a vertical sectional view taken on the line V—V of FIGURE IV;

FIGURE VI is a fragmentary transverse sectional view taken on the line VI—VI of FIGURE V;

FIGURE VII is a perspective view of the end of the rotating shaft and connection end thereon.

Numeral references are employed to designate the various parts shown in the drawings and like numerals indicate like parts throughout the various figures of the drawings.

The numeral 1 indicates a high vacuum chamber in which a conveyor 2 is disposed which is rotatable about the drums 3 at each end thereof. A vacuum is drawn upon the chamber 1 by a high vacuum pumping device 38 through a conduit 39.

A loading device 4 and an unloading device 5 are secured to the housing for the vacuum chamber 1, the functional parts of said loading and unloading devices being identical in construction, and the description of one will suffice for the description of the other.

Each loading and unloading device includes a housing which is made up of a top wall 6, a bottom wall 7 and a cylindrical wall 10. The top and bottom walls 6 and 7 are secured together by cap screws 8, and the bottom wall 7 is secured to the housing for the vacuum chamber 1 by means of nut and bolt assemblies 9 which pass therethrough. The housing thus described provides a chamber 11 in which a carrier 12, having a spherical surface 13 thereon, is rotatably mounted. The surface of the carrier is rotated through the relieved areas 14 and 15 provided in the top wall 6 and the lower wall 7.

Seal rings 16 and 17, which, as shown, are circular in form, are disposed in the upper and lower portions of the chamber 11 and each has surfaces 18 thereon which are pressed against, and conform to, the spherical surface 13 of the carrier 12. Thus, there is provided a slidable seal at the upper and lower ends of the chamber 11 against the spherical surface 13 of the carrier 12. The seal rings 16 and 17 are preferably made of resilient seal rubber or plastic material such as "Teflon."

A carrier recess 19 is provided in the surface of the carrier 12. The recess 19 may take any suitable form, to accommodate any shape or size of article to be passed into the vacuum chamber for processing. It will be noted that the seal surfaces 18 are wider than recess 19 so that the mouth of the recess is completely sealed as it passes to and from atmosphere to evacuated chamber 11.

A spring support 20 is disposed in the recess 19. A spring urged door 21 is rotatably mounted on shaft 21a at the upper end of the spring support 20 and is urged in upward or open position by a spring 22 disposed about shaft 21a.

A recess 23 is provided in the filler chute 25 to initially receive the spring urged door 23 to allow it to remain open while an article is being fed into the recess 19 through the passage 25a adjacent the filler chute 25.

A discharge chute 27, which has a like recess 27a therein to receive the spring urged door 23 is provided through the lower wall 7, and a discharge passage 26 is provided through said wall.

The carrier 12 is rotated by a suitable power means through a drive shaft 28 which passes through the wall 10, and has a semi-circular end 29 thereon, insertable in a corresponding socket 30 in the end of the carrier 12 to engage the shaft therewith. The shaft 28 is rotatable on the bearing 31 mounted in the wall 10.

An outlet passage 32 is provided in the lower wall 7 from which articles discharged from the vacuum chamber are guided along the outlet guide 33 into a suitable receptacle.

A suction passage 34 is provided through the wall 10 and has threadedly engaged therein a fitting 35 to which is attached a suction line 36. Suction is continuously drawn on the chamber 11 by a vacuum pump 37.

In operation articles to be processed are passed along the passage 25a and the chute 25 into the recess 19. As the carrier 12 is rotated, the spring urged door 21 will engage the upper seal 16 and will be pressed downwardly against the spring 22 to close the recess 19. The filler 24 maintains the door 23 closed to keep the article from falling out by gravity as it passes below the horizontal center line of the carrier 12. It will be noted that a vacuum is continuously drawn on the chamber 11 while this is taking place. When the spring urged door 21 reaches the recess 27, it will be allowed to spring open and the article in the recess 19 will be allowed to fall out into the passage 26 and it will be guided along the chute 27 onto the conveyor 2. The article is carried along the conveyor 2 until it is deposited on the chute 40 and passes through the passage 25 into a recess 19 in the carrier 12 of the unloading device, which is the same in construction as the loading device. The spring urged door 21 is maintained in closed position in the same manner as described with reference to the loading device as it rotates into position where the spring urged door 21 can open and allow the article to be deposited through the passage 32 and be guided along the chute 33 into a suitable receptacle.

It will be noted that while the article is passing through the loading and unloading devices the high vacuum chamber 1 is sealed and isolated from atmosphere so that there is no vacuum loss from the high vacuum chamber 1 while the article is being loaded and unloaded.

Having described my invention I claim:

1. In a device for passing an article into a vacuum chamber including a housing having walls defining an enclosed chamber; means for mounting the housing on a vacuum chamber; a passage establishing communication between the vacuum chamber and the enclosed chamber; a passage establishing communication between the atmosphere and the enclosed chamber; a spherical carrier rotatably disposed in the housing; an article receiving recess in the surface of the carrier, the said recess being arranged to be rotated into registry with the first and second named passages; separate spaced seal means in the housing surrounding the passages and being in slidable sealing relationship to the surface of the carrier; means to draw a vacuum on the area of the enclosed chamber between the separate seal means; and means to rotate the carrier from exteriorally of the housing.

2. The combination called for in claim 1 with the addition of a spring urged closure member positioned at the outer end of the recess, said closure member being biased in open position and being arranged to be held in closed position by contact with the seals and the interior of the enclosed chamber while being rotated between the passages; and a relieved area adjacent each passage adapted to receive the closure member to permit communiction between the passages and the recess.

3. The combination called for in claim 1 wherein the seal means are rings disposed against opposite walls of the housing, each seal surrounding one of the passages and having inner edge surfaces conformed to the shape of the spherical surface of the carrier.

4. The combination called for in claim 3 wherein the inner edge surfaces are wider than the recess.

5. The combination called for in claim 2 wherein the closure member is mounted on a support carried in the article receiving recess.

6. The method of passing an article into or out of a vacuum chamber comprising, depositing the article in a recess below the surface of a carrier; rotating the surface of the carrier within which the article is disposed past a seal into an enclosed chamber; rotating the surface of the carrier within which the article is disposed past another seal at the other side of the enclosed chamber; removing the article from the carrier; and drawing a vacuum on the enclosed chamber while the surface of the carrier is being rotated therethrough.

7. In a device for passing an article into or out of a vacuum chamber comprising, an evacuated area having an entry passage and an outlet passage thereinto at separated points; a resilient seal surrounding each passage; a rotary carrier rotatable through the evacuated area and past the passages, with the surface of the carrier being in slidable sealing contact with the seals; and an article receiving recess in the surface of the carrier in position to be rotated past the seals and through the evacuated area.

8. The combination called for in claim 7 with the addition of a spring urged closure member adjacent the recess biased in open position and arranged to be held closed over the outer end of the passage by contact with the seals and the inner surface of the evacuated area; and a relieved area adjacent each passage arranged to receive the closure member to allow same to open to establish communication between the passages and the recess.

9. The combination called for in claim 7 wherein the carrier is spherical in shape and the seals are ring seals having inner surfaces conformed to the surface of the carrier.

10. The combination called for in claim 9 wherein the inner surfaces of the seals are wider than the recess.

References Cited by the Examiner

UNITED STATES PATENTS

| | | |
|---|---|---|
| 888,257 | 5/1908 | Passburg. |
| 1,096,785 | 5/1914 | Jensen. |
| 2,424,675 | 7/1947 | Wood _____ 222—368 |

GERALD M. FORLENZ, *Primary Examiner.*

HUGO O. SCHULZ, *Examiner.*

R. G. SHERIDAN, *Assistant Examiner.*